United States Patent Office 3,147,766
Patented Sept. 8, 1964

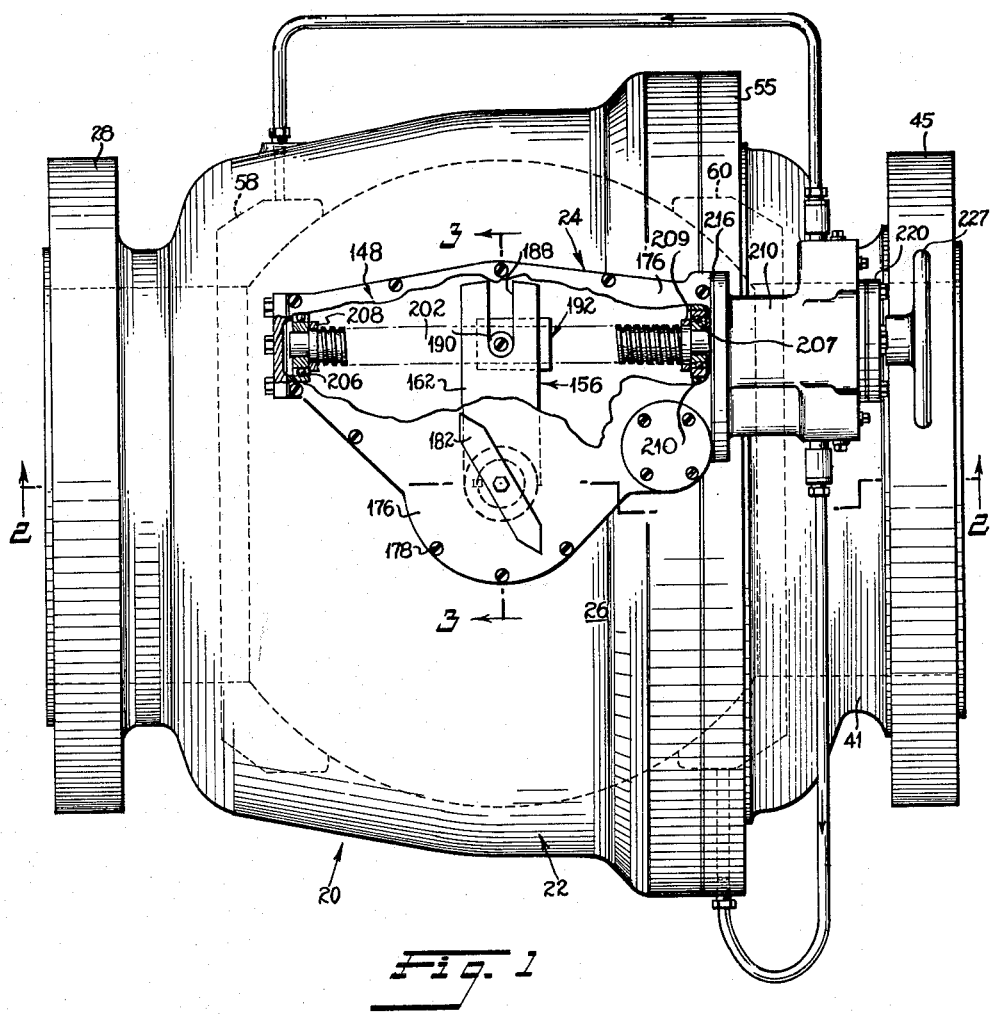

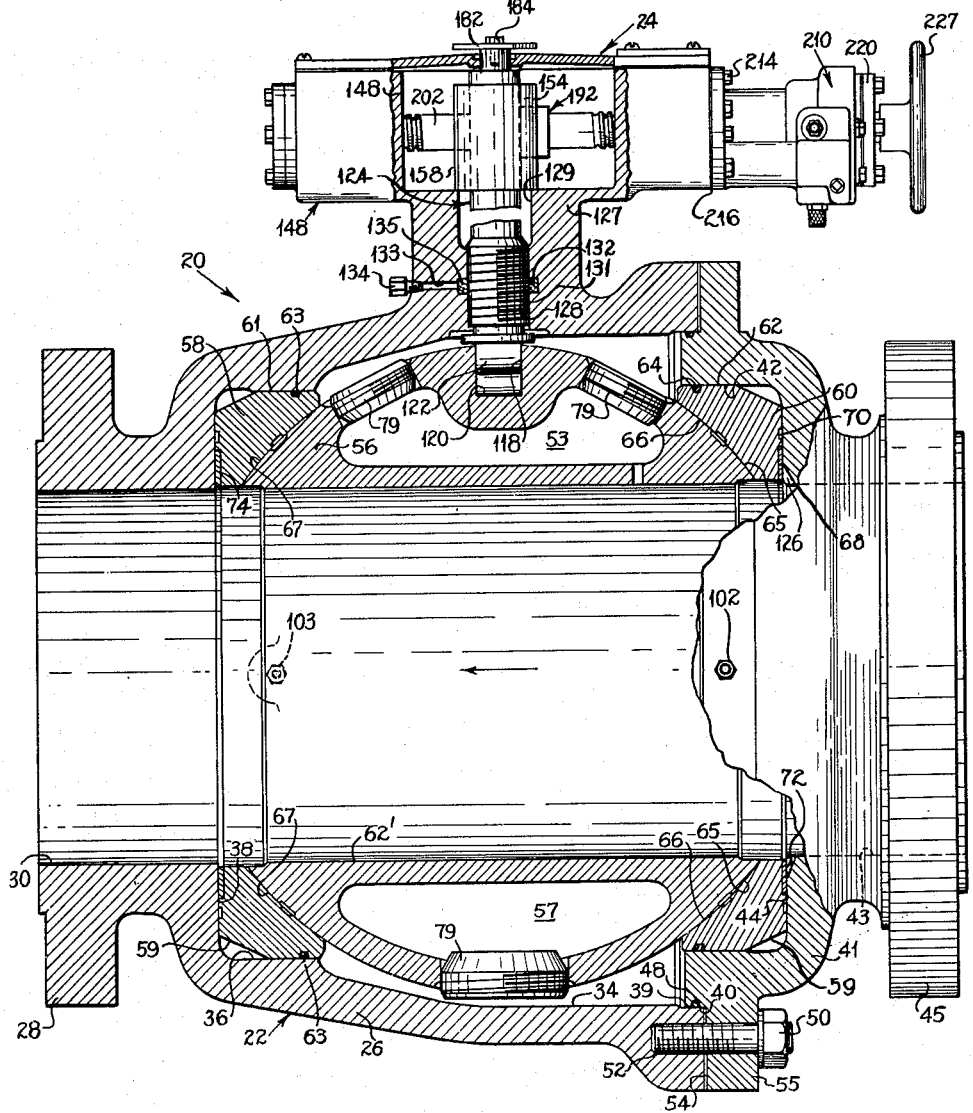

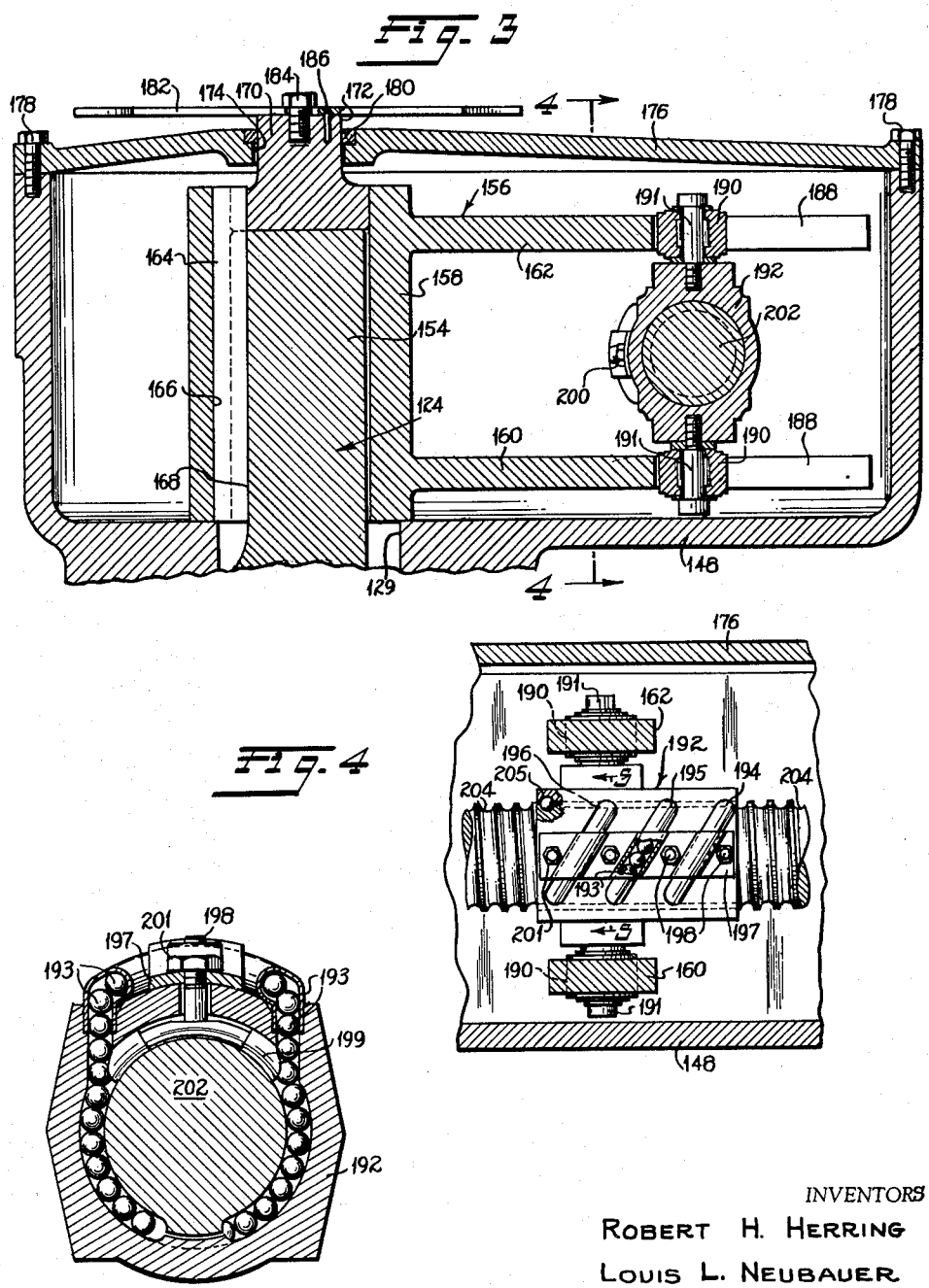

---

3,147,766
ROTARY PLUG VALVE AND OPERATOR THEREFOR
Robert H. Herring, Sulphur Springs, Tex., and Louis L. Neubauer, San Francisco, Calif., assignors to Rockwell Manufacturing Company, Pittsburgh, Pa., a corporation of Pennsylvania
Original application Sept. 11, 1953, Ser. No. 379,496, now Patent No. 2,979,071, dated Apr. 11, 1961. Divided and this application Sept. 19, 1960, Ser. No. 60,765
7 Claims. (Cl. 137—556.3)

This invention pertains to ball valves and operating devices therefor and more particularly to ball valve structures which include special ball turning arrangements.

The invention will be described in its preferred embodiment as applied to ball valves but it will be understood by those skilled in the art that certain aspects may be applied with equal advantage to various other types of plug valves.

This is a division of our copending application Serial No. 379,496 filed September 11, 1953, now U.S. Letters Patent No. 2,979,071 issued April 11, 1961.

The present invention contemplates an improved lightweight ball valve assembly particularly suitable for use in high pressure, large diameter pipe line service wherein a novel actuating linkage transmits improved turning effort to the valve plug stem to open or close the valve.

It is an object of the invention to provide a novel plug valve operating linkage for transmitting turning effort to the plug which lessens the turning effort required.

A further object of the invention is to provide a novel worm and ball bearing nut device for turning a valve plug.

Other objects of the invention will become apparent from the following description and subjoined claims in conjunction with the annexed drawings in which:

FIGURE 1 is a top plan view of the entire valve and operator assembly in an intermediate, partially-opened position with a portion of the operator housing broken away to show parts of the plug operating linkage;

FIGURE 2 is a longitudinal vertical section through the valve and operator assembly taken on line 2—2 of FIGURE 1 with some parts shown in elevation, but for simplicity the valve stem is shown broken to permit the ball to be shown in a fully-opened position;

FIGURE 3 is an enlarged fragmentary section taken on line 3—3 of FIGURE 1 showing the ball bearing nut to valve stem connection details;

FIGURE 4 is a section taken on line 4—4 of FIGURE 3 and showing details of the ball bearing nut; and FIGURE 5 is an enlarged section on line 5—5 of FIGURE 4 illustrating a ball bearing circuit;

Referring to the drawings and particularly to FIGURES 1 and 2, the ball valve assembly indicated generally as 20 comprises two main sub-assembly units: a ball valve proper 22, and an operating device 24.

The ball valve proper, as shown in FIGURE 2, comprises a tubular main housing member 26 having one end provided with a line attachment flange 28 through which there is a fluid flow passage 30. Housing 26 is provided within an interior bore 34 that is larger in diameter than passage 30 and formed adjacent passage 30 with a cylindrical surface 36 and a flat radial set ring backing surface 38. At its open end housing 26 is provided with an internal cylindrical surface 39 in which is piloted the external cylindrical surface 40 of tail piece 41.

Housing tail piece 41 is likewise formed with an internal cylindrical surface 42 of the same size as surface 36, a fluid flow passage 43 coaxial with and of the same size as passage 30, a flat radial seat ring backing surface 44 and a line attachment flange 45. In addition, the tail piece is grooved to receive a rubber O-ring 48 which is compressed between tail piece 41 and surface 40, when the two parts of the housing are assembled, to seal against leakage. Tail piece 41 is detachably secured to the main housing as by nuts 50 threaded on studs 52 and a suitable spacer 54 is interposed between the opposed end faces of the housing and radial flange 55 of the tail piece.

This spacer is used to control the assembly of the ball seats, housing, and tail piece, and may be omitted by machining the bearing face 44 of tail piece 41 to the proper depth after the amount of stock removal necessary for proper "fit-up" had been determined by a preliminary assembly. The procedure used is as follows:

The body is placed on its flanged end 28, and seats 58 and 60 together with a ball 56 are placed therein in the proper sequence. The semi-finished tail piece 41 is then positioned and drawn up with a torque of 300 foot pounds on each of the body stud nuts 50, using the standard criss-cross method of tightening pressure heads, etc. As tail piece 41 is initially machined deliberately with the bearing face 44 at too shallow a depth below the face of flange 55 which abuts the joint face of body 26, this preliminary assembly causes a gap which is shown in FIGURE 2 as filled by spacer 54. The average width of this gap is measured by feeler gages or the like, and the bearing face 44 of the tail piece 41 is refaced to a greater depth to obtain the proper preload deflection of the elastically backed seat rings 58 and 60.

Substantially spherical ball plug 56 is rotatably disposed within the valve housing on the annular seat rings 58 and 60. The plug is cored or hollowed out at the top and bottom as shown at 53 and 57, FIGURE 2, in order to reduce the weight thereof. In the present embodiment a cast ball is used and the openings left by the core prints used in the formation of cavities 53 and 57 may be closed by plugs 79.

Plug 56 contains a diametral passage 62' adapted to register with bores 30 and 43 when the plug is in the full open position of FIGURE 2. The plug may be rotated 90° about its vertical axis to close the valve as by means of linkage hereinafter described.

Still referring to FIGURE 2, rigid metal seat rings 58 and 60 are axially slidably mounted on the cylindrical surfaces 36 and 42 respectively in the housing assembly, and their external cylindrical surfaces 61 and 62 are grooved to receive suitable sealing means such as compressible rubber O-rings 63 and 64 disposed between the telescoped cylindrical surfaces. Inasmuch as the seat rings are preferably identical so as to be interchangeable, only one will be described in detail. Each seat ring has its outer corner cut away at 59.

The tail piece seat ring 60 is formed with a ground spherical surface 66 conforming closely to the curvature of the opposed spherical zones 65 and 67 of plug 56. The back surface of ring 60 is provided with an annular recess 68 and an annular groove 70. The annular recess 68 seats an annular compression spring 72 preferably of the type known as a Belleville spring which reacts against surface 44 of the tail piece to resiliently bias the seat ring 60 into surface contact with the plug. Seat ring 58 is similarly resiliently biased against the plug 56 by compression spring 74 reacting against surface 38 of the main housing. The Belleville spring used in the invention was a continuous ring of shallow arcuate cross section which would deform flat under sufficient compression but rings of conical or similar cross sections may be used.

As best shown in FIGURE 2, the upper surface of plug 56 contains a straight sided slot 118 having an arcuate bottom wall 120 and adapted to receive a straight sided tang 122 fixed to the lower end of a rotatable valve stem 124, which tang has a lower surface conforming to the bottom wall of the slot. The bottom wall 120 may also be a chordal surface perpendicular to a diameter of the plug which coincides with the axis of the plug stem. This construction reduces manufacturing costs without sacrifice of the advantages of the arcuate slot.

The slot 118 is arranged at right angles with respect to the axis of passage 62' so that when the plug has been rotated to closed position, the axis of slot 118 is parallel to the flow path through the valve and thus line pressure acting on the upstream face of the lug displaces the plug axially of the valve and against the downstream stream seat ring to improve the sealing contact therewith in direct proportion to line pressure. Sufficient clearance is provided between the tang and slot to permit shift of the plug toward one seat or the other in operation. At the same time, the upstream seat ring will be urged against the upstream face of the ball by the action of the associated Belleville spring resulting in a double peripheral seal between the seat rings and the ball. Also when the spring displaces the upstream seat toward the ball, line pressure will enter the space behind the upstream seat and urge it against the ball. It will be noted that this compound sealing effect is achieved for both directions of flow through the valve.

The top of the main housing 26 is formed with a boss 127 which may be integral with the drive gear housing 148 of operator 24. Internally boss 127 has a threaded bore section 128 and a larger bore section 129 opening into the interior of housing 148.

Valve stem 124 is formed above the tang 122 with a threaded section 131 rotatable in threaded bore section 128. As illustrated in FIGURE 2, threaded bore 128 is formed with an annular recess 132 connected by radial port 133 to a lubricant gun fitting 134. A ring of compressible packing material 135 is provided in recess 132, and when lubricant under pressure is introduced through port 133 it permeates the packing and provides a good fluid tight seal about the valve stem. A seal of this type is disclosed in Nordstrom Patent No. 2,204,440. The reduced upper end 154 of stem 124 extends freely through bore 129 up into housing 148.

The mechanism for operating the plug will now be described.

As shown in FIGURES 1 and 3, an operating lever 156 comprising a cylindrical hub 158 and a pair of spaced parallel radial arms 160 and 162 is non-rotatably secured on stem end 154 as by a key 164 engaging mated slots 166 and 168 in the hub and stem respectively. A button 170 disposed within the upper end of hub 158 atop stem end 154 is also non-rotatably secured to the hub by key 164 which engages a suitable slot in the marginal portion of the button. The top of button 170 is provided with a reduced diameter portion 172 which passes freely through an aperture 174 in a cover plate 176 secured to the top of housing 148 as by a plurality of cap screws 178, aperture 174 being counterbored to accommodate suitable packing 180.

A valve stem position indicator pointer 182 is fastened to the top of button 170 as by cap screw 184, a locating dowel 186 being provided to establish a predetermined orientation of the pointer relative to the valve ball so that the position of the ball may be determined by observation of the pointer. It is preferred that pointer 182 extends parallel to the axis of passage 62' in the ball when the valve is fully open.

Referring now to FIGURES 1, 3, and 4, the free ends of radial arms 160 and 162 are slotted as at 188 to receive anti-friction rollers 190 journaled on coaxial pivots 191 projecting from the top and bottom of a ball bearing nut 192. Ball bearing nut 192 is mounted for travel along a helically grooved worm shaft 202 that extends through housing 148 in a plane normal to the axis of rotation of ball 56.

Ball bearing nut 192 encloses three groups of spherical ball bearings 193, the balls of each group travelling in a predetermined helical passage formed by the semicircular cross section helical groove 204 in shaft 202 and the opposed internal helical groove 205 in the nut 192 and a ball transfer tube connecting the ends of the passage. The three transfer tubes are shown at 194, 195, and 196 in FIGURE 4 and they are held in position by a clamp 197 and bolts 198 that project upwardly from four arcuate deflector members 199 mounted in spaced relation along the helical passage in such position (FIGURE 4) as to deflect the balls of each group from the passage into the transfer tube and to deflect balls emerging from the transfer tube back into the passage. Nuts 201 secure these parts together. Thus when shaft 202 is rotated the turning effort is translated substantially without friction into longitudinal movement of nut 192 along the shaft. The ball bearing nut and helical worm shaft assembly is preferably the same as that disclosed in United States Letters Patent No. 2,505,131 issued April 25, 1950 to which reference is made for any further detail needed to understand the invention.

The left end of the shaft 202 (FIGURE 1) is journaled in the end wall of housing 148 in a suitable anti-friction bearing 206 while the other end is similarly journaled in bearing 207. Counterclockwise rotation of shaft 202 as viewed in FIGURE 3 causes the ball bearing nut 192 to travel along shaft 202 to the left in FIGURE 1, thereby rotating lever 156 and the valve ball counterclockwise. Stops 208 and 209 (FIGURE 1) are fixed on each end of the shaft to limit the travel of the ball bearing nut therealong and hence limit the rotation of the valve ball to 90° between fully open and fully closed positions.

As shown in FIGURES 1 and 2 bearing 207 is mounted in a portion of a lubricant pump housing 210 which is secured to the side wall of gear housing 148 through bolts 214 and gasket 216. The right end of shaft 202 extends through bearing 207 and terminates within the pump housing to be rotated by a suitable gear mechanism in the housing (not shown) operated by a handwheel 227 rotatably mounted in a pump housing end plate 220.

*Operation*

Assuming, for example, that the direction of fluid flow through the valve is as indicated by the arrow in passage 62' in FIGURE 2, and the valve is closed or rotated 90° from the FIGURE 2 position, the full line pressure bears on the plug and urges it against the downstream seat ring 58, which, being resiliently backed is displaced slightly from the upstream ring 60. The line pressure also acts on the upstream ring and urges it into sealing contact with upstream face of the plug. Thus, the axially slidable upstream seat follows the plug and provides a double peripheral seal regardless of the direction of flow.

In the event that it is desired to rotate the ball 56, for example, from closed position to the open position shown in FIGURE 2, handwheel 227 is rotated counterclockwise. By virtue of the gear mechanism (not shown) within pump housing 210 worm shaft 202 is similarly rotated and, consequently, the ball bearing nut 192 left along the longitudinal axis of shaft 202, exerting a counter-clockwise, valve-opening torque on the valve stem 124 through rollers 190 and the radial lever 156.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a valve assembly of the type characterized by a rotatable ported plug mounted to be turned about an axis between angularly displaced positions where it respectively opens or blocks a fluid line to fluid flow and by a valve stem for operating said plug, the combination with said rotatable plug of an operator comprising a housing having a lower wall formed with an opening to rotatably pass said valve stem, a shaft rotatably mounted within said housing about an axis perpendicular to said valve stem, a nut reciprocable along said shaft and having ball bearing and groove connections therewith, a lever having a hub having non-rotatable connection with said valve stem within the housing and having a flexible pivotal connection to said nut, said lever being swingable in a path parallel to said shaft axis, and means for indicating the angular position of rotation of the plug comprising a movable indicator portion rotatable with the hub of said lever and projecting through an opening in the top wall of the housing.

2. A combination as defined in claim 1 wherein said movable indicator portion comprises a pointer that remains parallel to the plug port.

3. In a valve assembly of the type characterized by a rotatable ported stemmed plug mounted to be turned about its stem axis between angularly displaced positions where it respectively opens or blocks a fluid line to fluid flow, the combination with said rotatable plug of an operator comprising a lever operatively non-rotatably connected at one end to said stemmed plug, said lever being movable in a path at right angles to said stem axis, an operator housing, a shaft journalled on said housing on spaced bearings for rotation about an axis that is parallel to said path and having a substantially helical groove of predetermined pitch extending along a portion of its length, a nut mounted for reciprocation on said shaft grooved portion having a mating internal helical groove and having ball transfer means therein opening at opposite ends into longitudinally spaced portions of said grooves to form a continuous passage with said grooves, a substantially endless column of spherical balls in said continuous passage, cooperating means on said nut and the other end of said lever to provide a flexible pivotal connection therebetween, and means for rotating said shaft about its axis.

4. An operator for a valve of the type having a rotatable plug and a plug operating stem comprising a housing, a shaft rotatably mounted within said housing on a fixed axis and having a helical groove of substantially semi-circular section, a nut mounted to travel along said shaft having a mating internal helical groove and having ball transfer means opening at opposite ends into longitudinally spaced portions of said grooves to form a continuous passage with said grooves, a column of spherical balls disposed in and adapted to move through said passage as the nut moves longitudinally of said shaft, and a motion transmitting lever for providing a connection between said nut and said valve stem, said lever being swingable in a path parallel to said shaft axis and having one end adapted to be non-rotatably mounted upon said valve stem and the other end slidably pivotally mounted on said nut, said connection providing a changing leverage for acting on said stem as the nut moves relative to said stem.

5. An operator for a valve of the type characterized by a body having a through passage intersected by a plug seating bore, by a ported plug rotatably mounted in said bore about its axis for movement between positions where it blocks and aligns its port with said passage, and by a plug operating stem comprising a lever having means for securing it to said stem at right angles to said stem axis, a rotatable shaft extending parallel to the plane of movement of said lever, an external helical groove of substantially semi-circular cross section on said shaft, a ball bearing nut member having an internal helical groove complementary to said shaft groove, an endless column of ball bearing elements in said grooves, means flexibly pivotally connecting said lever to said nut member, and means for rotating said shaft to axially displace said nut member therealong to rock said lever.

6. A combination as defined in claim 5 wherein said lever comprises a hollow hub adapted to fit over and be non-rotatably connected to a portion of said stem and parallel coextensive radial arms extending rigidly from longitudinally spaced portions of said hub into flexible pivotal connection with the upper and lower sides of said nut.

7. A combination as defined in claim 5 including a housing and having fixed stops located in spaced relation within said housing for positively limiting the plug turning movement of said lever to a definite angle.

References Cited in the file of this patent

UNITED STATES PATENTS

| | | |
|---|---|---|
| 1,279,900 | Pearsall | Sept. 24, 1918 |
| 1,890,524 | Martin | Dec. 13, 1932 |
| 2,293,199 | Foner | Aug. 18, 1942 |
| 2,443,036 | Hopkins | June 8, 1948 |
| 2,505,131 | Means | Apr. 25, 1950 |

FOREIGN PATENTS

| | | |
|---|---|---|
| 411,493 | Germany | Mar. 30, 1925 |